United States Patent Office 2,962,371

Patented Nov. 29, 1960

2,962,371

RECOVERY OF MATERIALS FROM FUEL ELEMENTS

Robert K. McGeary, Pittsburgh, Pa., assignor to Westinghouse Electric Corporation, East Pittsburgh, Pa., a corporation of Pennsylvania No Drawing. Filed Apr. 30, 1957, Ser. No. 655,963

4 Claims. (Cl. 75—84.1)

This invention relates to a method of separating core and cladding materials from fuel elements that contain as their core material a uranium base gamma phase alloy or an intermetallic compound of uranium with silicon, titanium, or other metals where the cladding and core materials are in intimate contact and cannot be separated by mechanical means.

The exacting specifications established for fuel elements that are designed for use in nuclear reactors generate a large proportion of rejects for various reasons. Such fuel elements contain a significant percentage of uranium or similar material which, of course, is very expensive, is available in limited quantities and requires essentially complete recovery. The cladding also is a unique and expensive material and it, too, should be recovered in an uncontaminated form, for economic reasons.

Attempts that have been made heretofore to recover such materials from elements which have not been approved for use have included various acid pickling methods. By those procedures a fuel rod or element, clad with zirconium or a zirconium base alloy, is immersed in a suitable pickling bath and removed at the time that the uranium or uranium alloy has been completely dissolved by the acid leaving the cladding intact. However, most pickling baths attack the cladding and core alloys with somewhat similar vigor thereby contaminating the recovered uranium with zirconium from the cladding.

Another method of core recovery that has been tested depends upon the differential in melting points between common claddings and core materials. For example, zirconium base claddings commonly have a melting point in the neighborhood of 1800° C. whereas the usual core materials melt at about 1150° C. and it would, therefore, appear that the element could be cut in half and the core alloys melted out. When attempts to cause a clean cut separation of the two materials by melting have been made, however, there has been found that a significant portion of the core is lost due to alloy formation of the uranium and constituents of the cladding under the influence of the high temperatures. Of course, the resolution of such alloys could be a more difficult task than the problem which engendered the alloys.

It is, therefore, a major object of the present invention to provide a process whereby the core and cladding materials of a zirconium clad fuel element may be recovered free, or substantially free, from one another, which process is simple, is inexpensive, does not entail significant loss of the core alloy or the cladding, can be practiced with equipment that is readily available and does not require highly trained personnel for its successful use.

I have discovered, and it is upon this discovery that the invention is in large part predicated, that zirconium or zirconium base alloy clad fuel elements containing uranium base gamma phase alloys or intermetallic compounds of uranium and another metal such, for example, as silicon or titanium as their fuel component can be stripped of cladding without loss of the core or cladding materials by treating such a fuel element at an elevated temperature with essentially pure anhydrous hydrogen. In this manner the valuable core and cladding materials can be recovered without encountering the losses that characterize procedures for that purpose known heretofore, such as the use of pickling baths or differential or selective melting.

In practicing my process, the fuel element is heated in an atmosphere of hydrogen at a suitably elevated temperature for a time sufficient to hydride the cladding so that it spalls from the core. The core is thereby freed from the cladding and may be reprocessed for further use. The hydrided cladding is collected and heated, suitably in a vacuum while pumping off the hydrogen, to a temperature sufficient to dissociate the hydride, and the free metal may then be reprocessed or otherwise used. To dissociate zirconium hydride, a temperature equivalent to red heat normally is used.

The hydrogen used in treating a fuel element in my invention should be essentially pure and anhydrous because the impurities usually found in hydrogen normally will react with the core material and thereby entail a loss of some of the core component. Furthermore, the initiation of reaction is influenced detrimentally by the presence of materials such, for example, as water, oxygen or nitrogen, and to that extent alone it is desirable that the hydrogen be free from those materials.

The process is carried out at an elevated temperature, the exact temperature being dependent primarily upon the composition of the cladding. In general, however, the temperature is about 250° to 425° C., and, more suitably, about 300° to 350° C. To obtain the optimum operating temperature the element, or the hydrogen, or both, may be heated sufficiently high to secure that result.

As pointed out above, this invention is concerned with zirconium clad fuel elements. The cladding materials which can most readily be stripped or spalled by this process are those essentially pure zirconium. However, claddings frequently are made of zirconium base alloys containing elements such as iron, nickel, chromium and tin in various amounts. Usually such alloying components are present in small amounts on the order of up to 5 to 10 percent, based on the weight of the zirconium. Particularly suitable zirconium base alloys for these purposes are described in the United States patent to Thomas et al., Number 2,772,964. My invention is applicable to fuel elements that are clad with alloys of that nature.

The core materials that may be recovered by the hydriding process of this invention are uranium base gamma phase alloys and intermetallic compounds of uranium. The gamma phase alloys include, by way of example, uranium alloyed with about 10 percent of such materials as molybdenum or niobium. Such gamma phase uranium base alloys are disclosed in my copending applications Serial No. 539,738 filed October 11, 1955, now Patent No. 2,793,705 and Serial No. 539,782 filed October 11, 1955, now Patent No. 2,926,-113. Typical of the intermetallic compounds that may be used as core components of fuel elements to which this invention applies are $U_2Si$ and $U_3Si$, the latter being a uranium alloy containing 3.8 percent by weight of silicon that has been treated at an elevated temperature below about 850° C. to form the compound. Other intermetallic compounds include $UTi_2$.

To demonstrate the process of the invention and to show the importance of using a temperature within the range hereinbefore mentioned, a fuel element is placed in a furnace and heated in such a manner that a temperature gradient along the element is produced. Such a gradient may readily be obtained by use of several induction heaters. In actual tests I have used temperature gradients along a fuel element such that the cold end was 100° C. while the hot end was 800° C.

The fuel element, having the intermetallic compound $U_3Si$ as the core material and the alloy, in weight percent, of 0.5 percent Cr, 2.0 percent Sn, 0.5 percent Fe and the balance zirconium, as the cladding, is placed in the furnace and heated to operating temperature in the manner aforesaid in an atmosphere of pure anhydrous hydrogen. After about a 15 minute incubation period the cladding that is in the temperature range of about 300° to 400° C. begins to spall from the element because the resulting compound, zirconium hydride, is very brittle and has a density that is less than that of the parent material. The spalling is essentially complete in an additional 15 minutes, although the hottest and coldest portions of the rod are not affected during that time as determined by visual examination. Moreover, no hydriding, and hence no loss, of the uranium core results.

While the invention is not to be limited by theory it is believed that reaction between the cladding and hydrogen at the higher temperatures does not occur due to the limited solubility of hydrogen at those temperatures, while no visible effects are observed at the low temperatures due to slowness of the reaction at those temperatures. When small bits of the cladding remain on parts of the core, they may be removed in any manner desired such as by a mechanical removal or a chemical treatment.

From these tests it is readily apparent that my invention is an efficient, easily effected method of stripping cladding from fuel elements to recover the core for reprocessing. The process does not involve the loss of core or cladding materials through deleterious attack by pickling baths or by forming alloys with one another. While the invention has been described with reference to a particular core material and cladding, it should be understood that the invention is practiced the same way with the other materials mentioned.

The stripping action in my process normally takes about 15 minutes for completion, after an incubation period of similar length. Sometimes the incubation period may extend beyond that time and may be due, for example, to an oxide film on the surface of the zirconium. Where an oxide film is present it is advisable that the element first be heat soaked at a temperature of, for example, about 600° to 800° C. to allow diffusion of the oxide into the metal. Then the process can proceed as described.

While I have described the invention as relating to clad fuel elements, it is to be understood that that term is intended in the broad sense of a covering without regard to the actual method of applying that material to the core. Moreover, it should be apparent that the invention may be practiced without regard to the size or shape of the fuel element and without regard to the method of manufacture by which the element was produced.

In accordance with the provisions of the patent statutes, I have explained the principle of my invention and have described what I now believe to represent its best embodiment. However, I desire to have it understood that the invention may be practiced otherwise than as specifically described.

I claim as my invention:

1. A method of separating the core and cladding materials of a zirconium clad member in which the core is of a metal relatively inert to hydrogen and comprises uranium base gamma phase alloys, which comprises the steps of heating such an element in an atmosphere of hydrogen at an elevated temperature of from about 250° C. to 425° C. whereby the cladding hydrides and spalls from the core, and recovering the core and cladding materials substantially free from one another.

2. A method of removing the cladding from a zirconium clad fuel element that contains material selected from the group consisting of uranium base gamma phase alloys and intermetallic compounds of uranium as its core component, comprising heating at an elevated temperature of from about 250° C. to 425° C. such a fuel element in essentially pure anhydrous hydrogen, and recovering the core free from sad cladding.

3. A method according to claim 2 in which said cladding is a zirconium base alloy containing up to about 10 percent by weight of alloying elements.

4. A method according to claim 3 in which said alloying elements in said zirconium cladding are selected from the group consisting of iron, chromium, nickel and tin.

References Cited in the file of this patent

UNITED STATES PATENTS 2,704,249 Mushovic ............. Mar. 15, 1955